(12) United States Patent
Font Ventura et al.

(10) Patent No.: US 11,474,503 B2
(45) Date of Patent: Oct. 18, 2022

(54) DEVICE FOR HEATING FILLED BRIOCHES

(71) Applicant: INBROOLL INDUSTRIES, S.L., Palol de Revardit (ES)

(72) Inventors: Marc Font Ventura, Cervia de Ter (ES); Jaume De Palol Masdevall, Banyoles (ES); Miquel Coma Vila, Banyoles (ES); Rafael Hesse, Bescano (ES); Irene Pijoan Pages, Banyoles (ES)

( * ) Notice: Subject to any disclaimer, the term of this patent is extended or adjusted under 35 U.S.C. 154(b) by 0 days.

(21) Appl. No.: 16/636,553

(22) PCT Filed: Jul. 31, 2018

(86) PCT No.: PCT/EP2018/070718
§ 371 (c)(1),
(2) Date: Feb. 4, 2020

(87) PCT Pub. No.: WO2019/025435
PCT Pub. Date: Feb. 7, 2019

(65) Prior Publication Data
US 2020/0367693 A1    Nov. 26, 2020

(30) Foreign Application Priority Data

Aug. 4, 2017    (ES) ................................ U201730946

(51) Int. Cl.
*G05B 19/418*   (2006.01)
*A47J 37/06*   (2006.01)
*B30B 15/34*   (2006.01)

(52) U.S. Cl.
CPC ..... *G05B 19/41815* (2013.01); *A47J 37/0611* (2013.01); *A47J 37/0676* (2013.01);
(Continued)

(58) Field of Classification Search
CPC ................ A47J 37/0611; A47J 37/0676; A47J 2037/0617; A47J 37/06
(Continued)

(56) References Cited

U.S. PATENT DOCUMENTS 3,696,734 A * 10/1972 Beasley ............... A47J 37/0611
99/331
3,978,238 A *  8/1976 Frey ...................... A47J 27/004
426/523

(Continued)

FOREIGN PATENT DOCUMENTS

WO    WO 2007/127072 A2    8/2007
WO    WO 2015/164489 A1    10/2015

*Primary Examiner* — Tu B Hoang
*Assistant Examiner* — Thomas J Ward
(74) *Attorney, Agent, or Firm* — Eugenio J. Torres-Oyola; Victor M. Rodriguez-Reyes; Rafael Rodriguez-Muriel (57) ABSTRACT

A device (1) for heating filled brioches preferably filled with ice-cream, comprising an upper subassembly (3) and a lower subassembly (4) linked by one or more joints or hinges (10). Each one of the subassemblies (3, 4) includes a heating plate (14) with a cavity (14a) intended to receive the filled brioche, or other similar product, in order to heat it, arranged so that in an operative position they overlap one another. Each heating plate (14) is positioned on top of a heat transfer plate (16) enclosed in a thermoinsulating layer (13), except for an opening to allow contact between the heating plate (14) and the heat transfer plate (16).
The heating plates (14) are releasable from the subassembly (3, 4) on which they are arranged by means of one or more releasable fastening elements protruding from the heating plate (14) and inserted in one or more slots (3c, 4c) of either casing of the subassemblies (3, 4).

17 Claims, 5 Drawing Sheets

(52) U.S. Cl.
CPC ....... *A47J 2037/0617* (2013.01); *B30B 15/34* (2013.01); *G05B 2219/45142* (2013.01)

(58) Field of Classification Search
USPC ......... 99/331, 339, 342, 349, 353, 372, 377, 99/378, 379, 389, 400, 422, 425, 426, 99/446; 219/331, 386, 401, 415, 461, 219/492, 494, 521, 524, 525, 537, 585
See application file for complete search history.

(56) References Cited

U.S. PATENT DOCUMENTS

| | | | | |
|---|---|---|---|---|
| 5,255,595 | A * | 10/1993 | Higgins | ............... A47J 37/0611 219/438 |
| 5,937,742 | A * | 8/1999 | Steeb | ................... A47J 37/0611 99/375 |
| 6,595,114 | B1 * | 7/2003 | Endres | ................. A47J 37/0611 99/342 |
| 2010/0186601 | A1 | 7/2010 | Gulkanat | |
| 2016/0183720 | A1 | 6/2016 | Yan | |
| 2018/0333000 | A1 * | 11/2018 | Nie | ..................... A47J 37/0611 |

* cited by examiner

DEVICE FOR HEATING FILLED BRIOCHES

TECHNICAL FIELD

The proposed invention relates to a device for heating filled brioches, especially those filled with a frozen substance. The invention pertains to the field of devices or electrical appliances intended for the preparation of foods intended, in particular, for the catering sector.

STATE OF THE ART

In the current state of the art similar devices are known whose main function is the preparation of waffles starting from dough, also available on the market. These devices, of "sandwich press" or "waffle iron" type, used for the preparation of waffles, are disclosed, for instance, in U.S. Pat. No. 9,554,670 and WO 2014036588.

From said documents, a device is known for the preparation of hot dough by means of at least two heating plates, which may be removable, and each heating plate is provided with a cavity to receive the dough that is to be heated.

Said heating plates are arranged inside the device, which is divided into an upper subassembly and a lower subassembly, the latter having the function of a base of the device, both subassemblies being hinged to one another. The heating plates inside the device are arranged, at least one of them being located in the upper subassembly and at least a second one in the lower subassembly, and arranged in an operative position overlapping one another.

These devices also include at least one heat transfer plate located in at least one of the upper or lower subassemblies that has an associated thermostat which is configured to regulate the temperature.

These devices have several problems which derive from the fact that the heating plates are attached to at least one of the subassemblies and do not have a system providing some degree of rocking movement or play that allows to guarantee an optimal contact between said oppositely arranged heating plates when closing the device, such that, if the amount of dough that is placed into the cavities of the heating plates is not uniformly distributed, the heat transfer throughout the dough will be variable and, therefore, the obtained brioche will not have uniform heating. On the other hand, the fact that the plates do not completely contact each other when oppositely arranged may cause leakage or spillage of the frozen substance filling which would seep out of the brioche.

U.S. Pat. No. 9,554,670 discloses a device of said type that offers the possibility to remove the heating plates, but neither specifies nor describes how or where the heating plates are attached, how they are removed or which the specific elements are that may be removed so that they can be washed or substituted. Therefore, it does not provide the necessary information to carry out the removal of the heating plates or other possible elements.

BRIEF DESCRIPTION OF THE INVENTION

The invention aims to provide a device for heating filled brioches, generally containing a frozen substance. The device comprises, according to a structure already known in the state of the art, for example, from one or more of the recited background items:
- an upper subassembly and a lower subassembly, the latter carrying out the function of a base and both being hinged to one another;
- two or more removable heating plates, each one provided with a cavity to receive the product, one or more of said heating plates installed in the upper subassembly and the other one or more heating plates installed in the lower subassembly, arranged so that in an operative position, overlap one another;
- two or more light indicators, to display the operative state of the device and report that the heating plates have reached a defined determined temperature; and
- at least one thermostat that is configured to regulate the temperature of said heating plates.

The heating plates are heated, for example, by means of a resistor, embedded or fitted in the plate itself or attached thereto.

The heating plates used have a configuration which adequately adapts to the corresponding subassembly, adopting, for instance, quadrangular geometry. A cavity exists in the centre of each surface with a prescribed form or pattern in order to shape the final edible product, generally according to a prescribed hemispherical geometry to produce a brioche with spherical geometry.

According to the proposal of the present invention, the device for heating filled brioches is characterized in that each of said removable heating plates is linked to the upper or lower subassembly wherein it is installed by means of at least one preferably releasable attachment or fastening element, which allows for the relative shifting of the heating plate relative to the respective subassembly wherein it has been inserted, and in thermal contact with a heat transfer plate that has a heating thermal resistor attached or connected thereto.

In one preferred embodiment of the invention, the heat transfer plate and the heating thermal resistor are housed in an enclosure supported in the respective upper or lower subassembly on loaded elastic elements, which press said enclosure against the corresponding heating plate, ensuring, by means of an opening of said enclosure, an optimal contact with the heat transfer plate, and there existing guide columns configured to allow a guided shifting of the enclosure along a shifting stroke.

According to one exemplary embodiment, said attachment element is releasable and is formed by an elongated piece of an elastic and/or compressible material which does not deform easily, such as, for instance, a tab, a flange or a piece of equivalent functionality, said tab being attached to one of said subassemblies by means of a through slot in each of the subassemblies and said tab being linked to a heating plate. In an alternative embodiment, it is contemplated that two releasable fastening elements be arranged on opposite side faces of each heating plate and, therefore, each of the subassemblies has two slots for attaching both tabs.

Said heat transfer plate is surrounded by a thermoinsulating layer, except for an area where it has a wide opening—for instance, a central area—that allows for a direct contact of said heat transfer plate with the heating plate to which it is attached.

The arrangement of said loaded elastic elements, preferably preloaded springs or elastic elements, will be adapted to the geometry of the supporting enclosures that house the heat transfer plates in order to ensure their correct stability, such that preferably 4 loaded springs will be used, one being located on the back side of each of the corners of the heat transfer plate wrapped by the thermoinsulating layer.

In an alternative exemplary embodiment, it is contemplated that the device should include a lower subassembly which includes two or more independent heating plates, in an adjacent position and the upper subassembly should consist of an equivalent number of independent heating plates, complementary to the heating plates of the lower subassembly, said plates of the upper and lower subassemblies being in an operative position, mutually opposed and overlapping. This arrangement allows an increase in the production capacity of the device and, in addition, the configurations of the cavities of one and other plates may be different, whereby different brioches may be produced. In this case, furthermore, the heat transfer plates (in thermal contact with each group of two opposing heating plates), respectively supported in the upper and lower subassembly, are controlled by an independent regulating thermostat.

BRIEF DESCRIPTION OF THE FIGURES

The former and other advantages and characteristics will be more fully understood from the following detailed description of an exemplary embodiment with reference to the attached drawings, which must be understood as illustrative and non-limiting, wherein.

DETAILED DESCRIPTION OF AN EMBODIMENT

The attached figures show several exemplary embodiments of the present invention having an illustrative non-limiting character.

It will be understood that different parts that constitute the invention described in an embodiment may be freely combined with the parts described in other different embodiments, even if such a combination has not been explicitly explained or shown, provided that no prejudice results from the combination.

It should be noted that any description which only describes one of the subassemblies of the device, and the components or pieces which form it, will be valid or applicable, only in the corresponding cases, to the subassembly that is not mentioned.

Figure 1A:
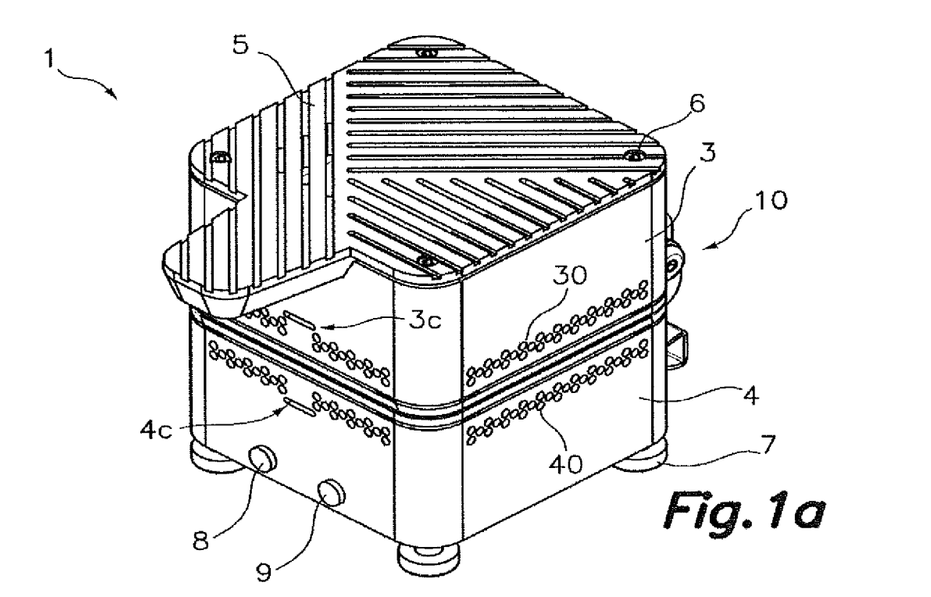
FIGS. 1a and 1b show, respectively, a perspective view of the device of the invention in closed and opened positions, respectively.

FIG. 1a illustrates a device 1 for heating filled brioches arranged in an operative position for heating a brioche.

Said heating device 1 is formed by an upper subassembly 3, a lower subassembly 4, a decorative closing plate 5, at least one joint 10 such as a hinge, supporting elements or feet 7, which preferably allow to adjust the height of the device or level the same relative to a supporting top or surface, two light indicators 8 and 9, preferably of LED or neon type, wherein one of them indicates the operative state of the device 1, preferably by the use of a green colour, and the other one indicates whether the heat transfer plates 16 have reached a predetermined baking temperature or a user-defined temperature, preferably by the use of a red colour.

The upper subassembly 3 and the lower subassembly 4 are preferably linked by two joints 10, in this case two hinges. Said hinges 10 are formed (see FIGS. 2 and 3b) by two fixtures or appendages 3a and 4a that respectively protrude from each subassembly 3 and 4 and are linked by means of a cylindrical pin 11. The walls of the casing of both subassemblies 3 and 4 have a series of bores 30, 40, distributed on the entire surface proximal to the heating area that allow for an optimal ventilation of the interior of the device 1, in addition to at least one slot 3c, 4c, preferably two, arranged on opposite walls of the casing of each subassembly 3 and 4, which are used for engaging or removing heating plates 14 (seen in FIG. 1b) by means of at least one releasable fastening element, not seen in this FIG. 1b.

The decorative closing plate 5 is attached to the subassembly 3 by means of a number of, preferably four, screws 6, arranged on each corner of said plate 5. In this particular example, the plate 5 is made of a non-thermal conductive material, for example, wood, and it has a fixture that overhangs from the device 1, used as a handle, that allows to raise or lower the upper subassembly 3, swinging around said hinges. Said plate 5 also has through slots that allow for additional ventilation of the upper subassembly 3 heating elements of the device 1, which complements the ventilation by the bores 30, 40.

The supporting feet 7 act as adjustable supports of the lower subassembly 4, which carry out the function of a base of the device 1. Preferably, four supporting feet 7 are used, each one arranged in a corner of the lower subassembly 4, thus providing greater stability to the device 1.

Figure 1B:
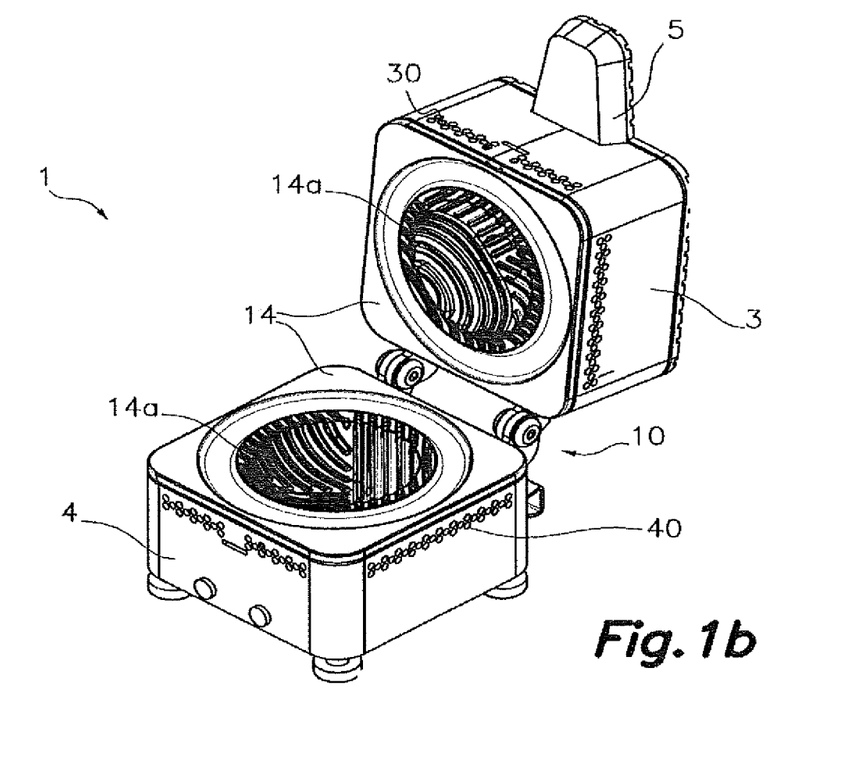

FIG. 1b illustrates the device 1 of FIG. 1a, for heating filled brioches, arranged in the open position, without any product, wherein the upper subassembly 3 and the lower subassembly 4 are arranged at 90° to each other. Both heating plates 14 of each upper 3 and lower 4 subassembly and their respective cavities 14a, intended to receive the filled brioches—for example, of a frozen substance—for their heating, can be seen.

Figure 2:
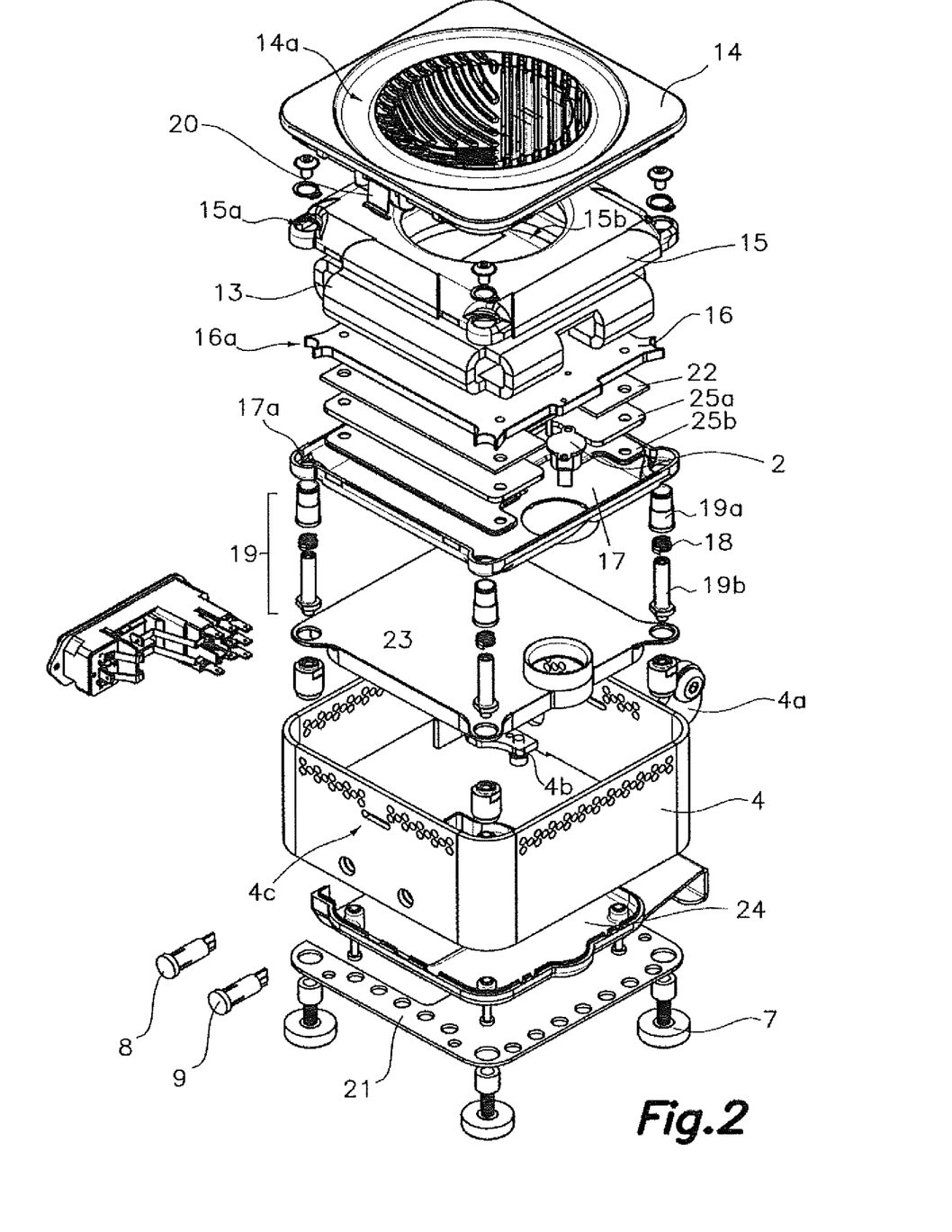
FIG. 2 shows an exploded view of the lower subassembly of the device of the proposed invention.

FIG. 2 illustrates an exploded view of the lower subassembly 4 of the proposed device 1, and shows how the heating plate 14 overlaps the heat transfer plate 16, which is wrapped by the thermoinsulating layer 13 except for a face wherein an opening exists. A releasable attachment or fastening element that allows separating and removing the heating plate 14 from the subassembly 4 is also illustrated.

Figure 3A:
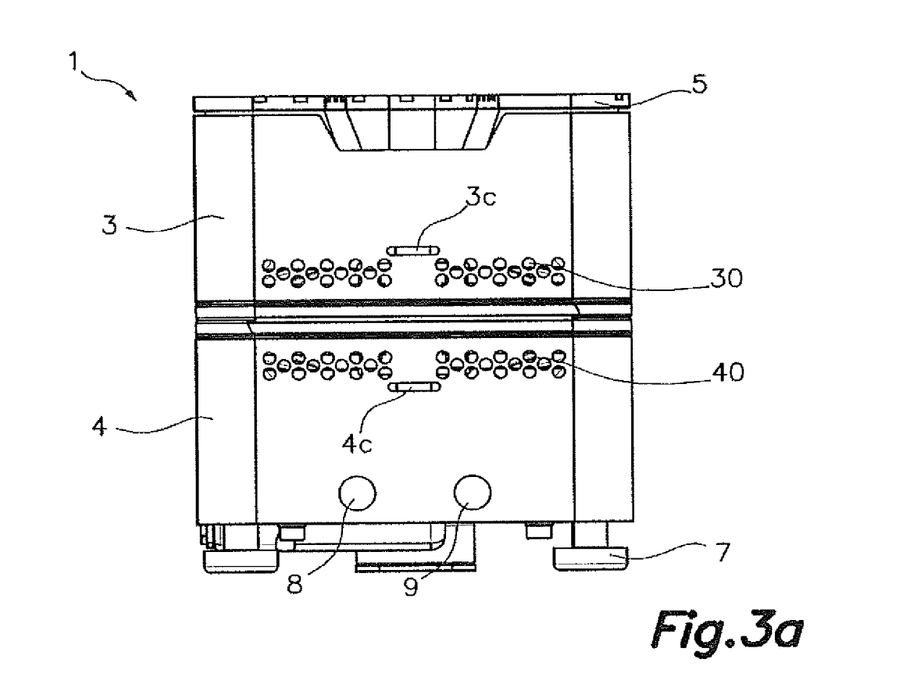
FIGS. 3a, 3b and 3c show an elevation view of the device and of its respective section along a central vertical plane, respectively, and a detail that allows a better view of the releasable fastening element arranged in one of the slots.
Figure 3B:
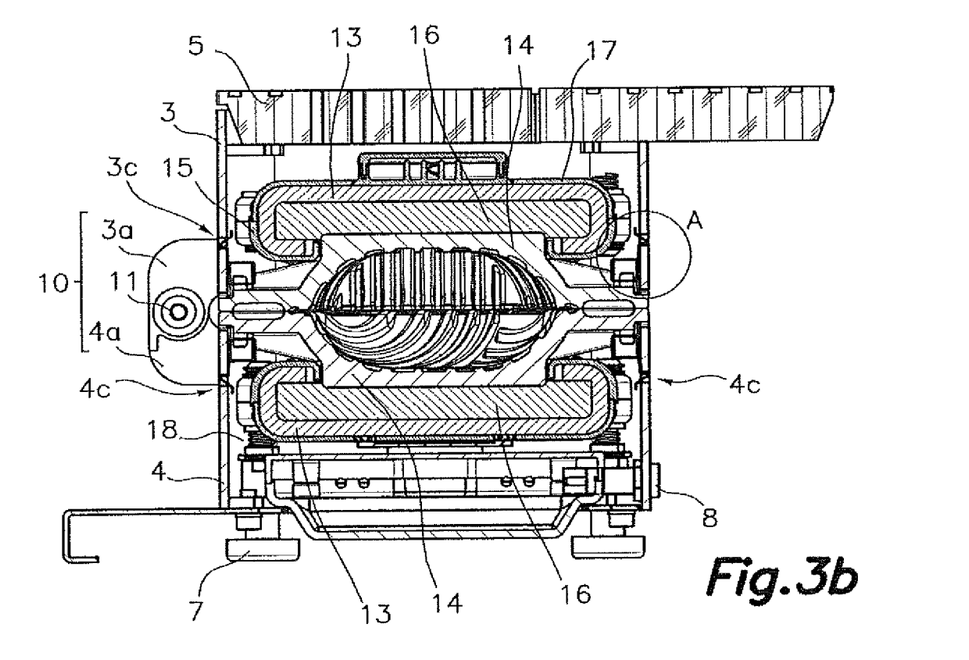

The releasable fastening element is formed, in this embodiment, by an elastic tab 20 that protrudes vertically from at least one of the side faces of the heating plate 14, preferably from a centred position of the side face (see mounting arrangement of FIG. 3b). Said tab 20 is attached to the lower subassembly 4, a portion of the tab 20 being retained by a slot 4c of the lower subassembly 4, such that the releasing and subsequent removal of the heating plate 14 are feasible by applying a compression force or pressure on the tab 20, by means of an instrument or tool whose end may be easily inserted into the slot 4c.

The different heating 14 and heat transfer 16 plates, both of which are part of the lower subassembly 4 and of the upper one 3, are arranged in such a way that each heat transfer plate 16, which has a heating thermal resistor 22 attached thereto, is wrapped (except for a face where an opening exists for abutment with the corresponding heating plate 14) by a thermoinsulating layer 13.

Each heat transfer plate 16 is housed inside a thermally insulated enclosure 26, formed by two half enclosures 15 and 17, which form a single enclosure 26, when coupled to one another, the half enclosure 15 having an open area 15b that allows the rear surface of the heating plate 14, arranged on the back side of the cavity 14a of the heating plate 14, to be in thermal contact with the heat transfer plate 16. The heating thermal resistor 22 is pressed against the heat transfer plate 16 by means of an aluminium plate 25b and an additional insulating layer 25a is located therebetween. Thus, in this particular exemplary embodiment, the assembly of the heating thermal resistor 22, the heating plate 14, the aluminium plate 25b and the insulating layer 25a forms a multilayer assembly, the different plates and layers being stacked and overlapping. Such an arrangement is derivable from said FIG. 2.

The heat transfer plate 16 and both half enclosures 15 and 17 surrounding the thermoinsulating layer 13 have lugs with through bores 15a, 16a and 17a on their four corners, the through bores 16a having semi-circular geometry, a guide column 19—formed by a first outer guide column 19a and a second inner guide column 19b inside the former—going therethrough, on which a loaded elastic element 18, preferably a spring, is coaxially mounted. Each guide column 19, specifically said first outer guide column 19a, is supported on a support 4b attached to each of the four corners of the interior of a prismatic casing that delimits the lower subassembly 4 (see FIG. 2).

Figure 4:
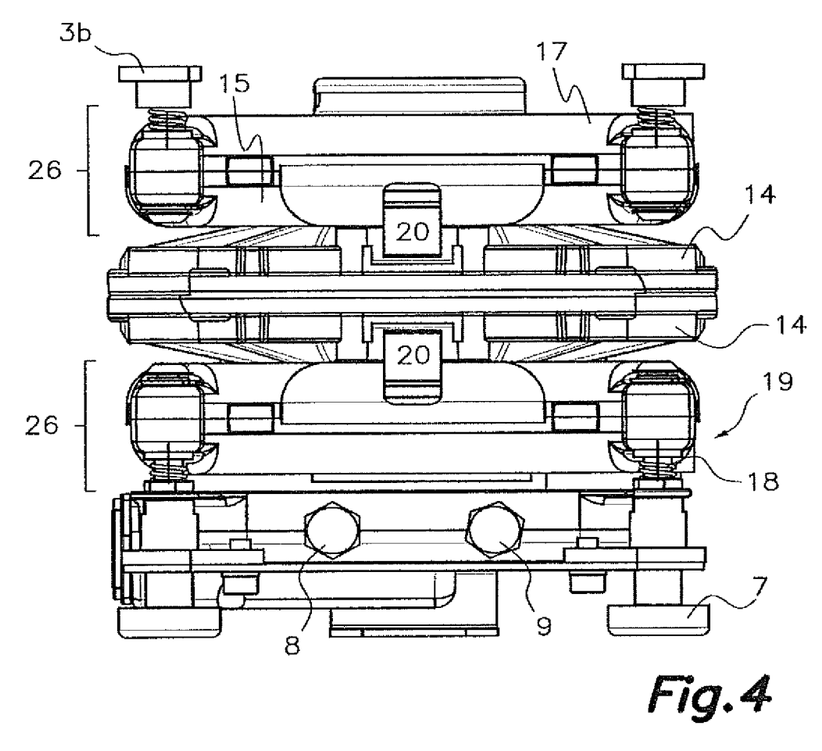
FIG. 4 shows a simplified elevation view of the device, wherein only the arrangement of some of the essential elements of the proposed solution has been portrayed for an improved understanding thereof.

The loaded elastic element 18, coaxially arranged to the guide column 19b, is in contact with the back side of the enclosure 26, which houses the heat transfer plate 16. FIG. 4 shows how, according to one essential characteristic of the invention, both enclosures 26 that house the corresponding heat transfer plates 16 of the lower 4 and upper 3 subassemblies, are arranged opposing one another and are pressed against the rear faces (exterior to the cavity receiving the dough that is to be heated) of the corresponding heating plates 14. The assembly of the guide column 19 is attached to the half enclosures 15 and 17 that form said enclosures 26, and to the lower subassembly 4 using several fastening components, retention gaskets and threaded couplings, according to well-known solutions. The lower subassembly 4 is closed by means of a closing plate 21. The device 1 controller/switch 12 is included in one of the sides of the lower subassembly 4 that is arranged inside the junction box defined by an upper cover 23 and a lower cover 24.

FIG. 3a and FIG. 3b respectively illustrate an elevation view of the filled brioches heating device 1 and a view of a central sectional view of the same device 1 of FIG. 3a.

In order to simplify the portrayal of the components only the heat transfer plate 16 has been portrayed in FIG. 3b, omitting said multiple multilayer elements, which are connected therein, such as the heating thermal resistor 22, the aluminium plate 25b and an additional insulating layer 25a, located there between.

In FIG. 3b, the heating device 1 is shown in a closed position, equivalent to the one shown in FIG. 1a, in a cross section across the cavity 14a of the respective, mutually overlapping heating plates 14 of the upper 3 and lower 4 subassemblies. This view allows seeing how the heat transfer plates 16 are arranged inside the half enclosures 15 and 17 surrounded by a thermoinsulating layer 13, and the contact between the heat transfer plates 16 and the heating plate 14. It can also be seen how the tab 20 is coupled to the upper 3 and lower 4 subassemblies by means of the slots 3c and 4c, respectively.

Figure 3C:
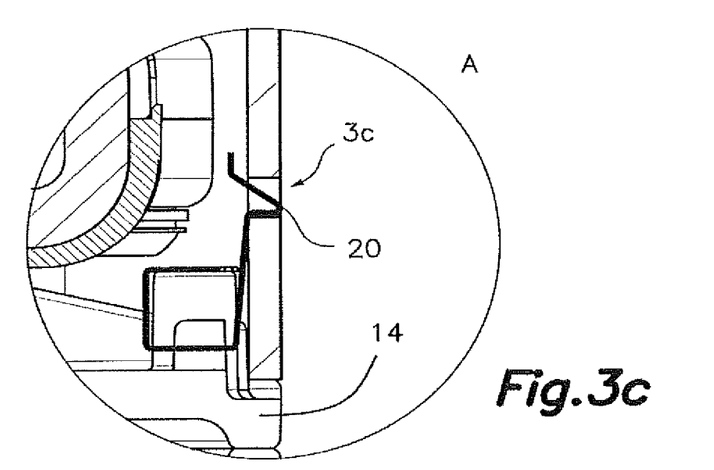

FIG. 3c illustrates a detail view A (shown in FIG. 3b) which affords a larger detailed view of how tab 20 is arranged inside one of the slots, specifically one of the slots 3c of the upper subassembly 3.

FIG. 4 illustrates on a larger scale an elevation view of the device 1 for heating filled brioches, wherein the relative arrangement of each of the enclosures 26 can be see, in a closed position of the device, relative to the heating plate 14 in the interior of both upper 3 and lower 4 subassemblies.

Enclosure 30 is formed by two half enclosures 15 and 17 and it houses therein the heat transfer plate 16 (which, in this exemplary embodiment, has the heating thermal resistor 22 attached thereto, in addition to the aluminium plate 25b and an additional insulating layer 25a located there between), the thermoinsulating layer 13 wrapping said heat transfer plate 16 and the adjustable thermostat 2 in contact with the heating plate 14.

In FIG. 4, one of the aspects of the invention is illustrated with respect to the arrangement of the heat transfer element, included in said enclosures 26, which are elastically pressed by means of the guide column assembly 19 against the respective heating plates 14.

Figure 5:
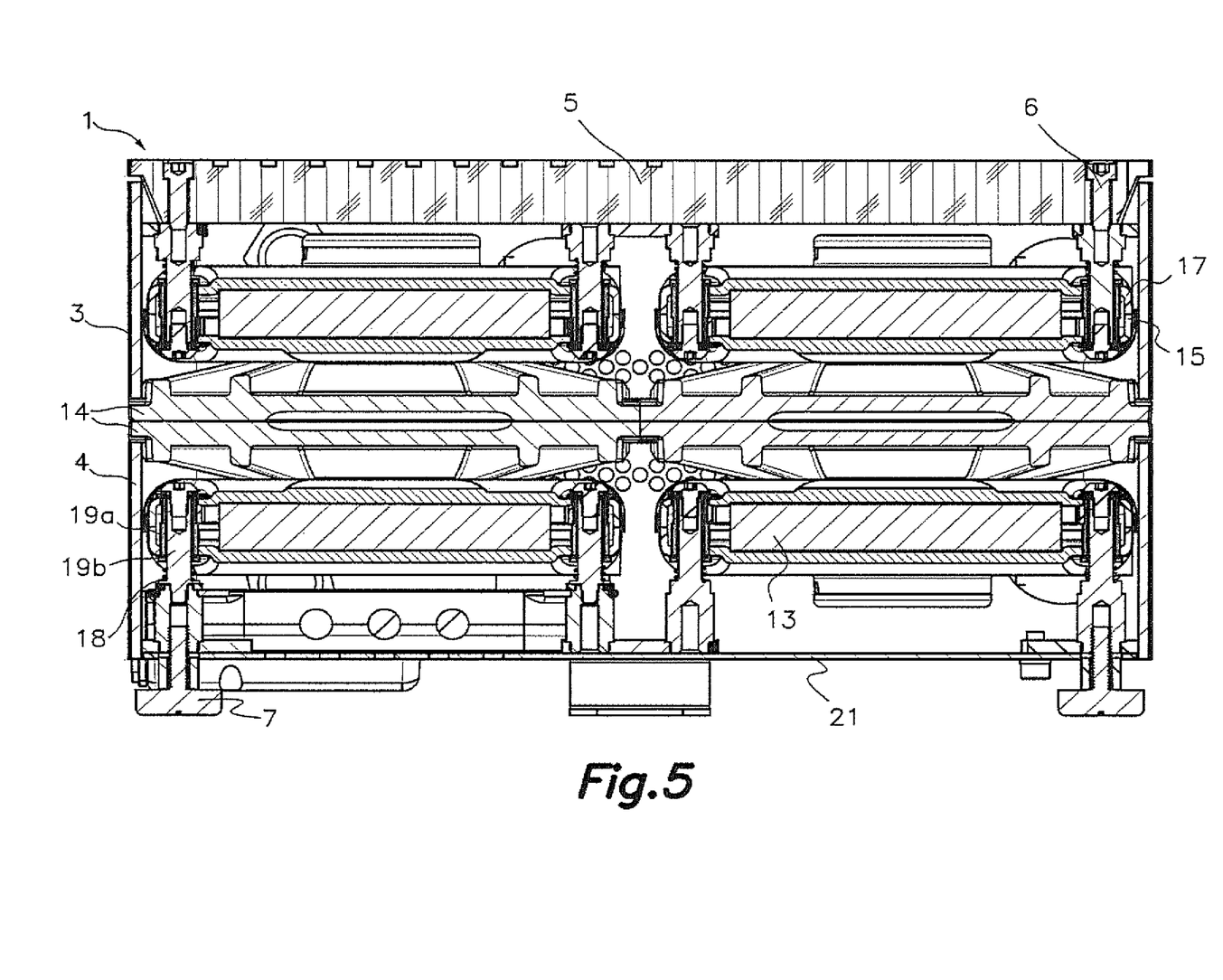
FIG. 5 shows a sectional view of the device, in an exemplary embodiment wherein said device has two independent brioche preparation areas in the same device.

FIG. 5 illustrates a profile section of another alternative exemplary embodiment of the filled brioches heating device 1 wherein said device 1 is formed by its respective upper 3 and lower 4 subassemblies, each of which, in this case, enables two distinct independent and separately adjusted areas, with their respective thermostat 2, for the preparation of filled brioches, preferably filled with ice cream.

The invention claimed is:

1. A device for heating filled brioches with a frozen dough filling, which includes an upper subassembly and a lower subassembly hinged to one another; each subassembly including:
- a casing;
- at least one heating plate removably linked to the correspondent casing by at least one releasable fastening element providing shifting of the heating plate relative to the respective casing while in operation, the releasable fastening element being attached to a back side of each heating plate;
- each heating plate is a single piece heating element integrating, in a front side thereof, a semi spherical cavity for receiving a product and a channel surrounding the spherical cavity, and the heating plates of the upper and of the lower assembly being oppositely arranged when the device is in a closed position;
- at least one heat transfer plate, with a heating thermal resistor attached thereto, housed in an enclosure having a thermo-insulating layer, each heat transfer plate being in thermal contact with the back side of one heating plate through an opening defined in the enclosure and in the thermo-insulating layer, the enclosure being supported in the respective casing through guide columns providing a guided shifting of the enclosure along a shifting stroke;
- loaded elastic elements that press each enclosure, and the heating transfer plate housed therein, against the correspondent heating plates ensuring contact and elastically urging the heating plates against the facing heating plate of the other subassembly when the device is in closed position through said shifting provided by the releasable fastening elements; and
- at least one thermostat configured to adjust the temperature of the heating plates, wherein the lower subassembly consists of at least two independent heating plates, and the upper subassembly consists of at least two independent heating plates complementary to the heating plates of the lower subassembly.

2. The device according to claim 1, wherein the elastic elements are coaxially arranged relative to the guide columns, which rest on supports of the upper and lower subassemblies.

3. The device according to claim 1, wherein the enclosure is constituted by a coupling linkage of two half enclosures.

4. The device according to claim 1, wherein each releasable fastening element comprises at least one elastic tab inserted in a slot, providing attachment between the heating plate and the respective casing.

5. The device according to claim 1, wherein each heating plate is linked to its respective casing by at least two releasable fastening elements arranged on opposite sides of the heating plate.

6. The device according to claim 1, wherein the heat transfer plate includes a heat transfer resistor.

7. The device according to claim 1, wherein the heat transfer plate and the heating plate are quadrangular.

8. The device according to claim 2, wherein the enclosure has corners, and the elastic elements comprise four loaded springs, each one applied to one corner of the enclosure.

9. The device according to claim 1, wherein the heat transfer plates in thermal contact with each group of two opposing heating plates respectively supported in the upper or lower subassembly are controlled by an independent regulating thermostat.

10. The device according to claim 1, which also comprises two or more light indicators wherein at least the first light indicator indicates the operative state of the device and wherein at least the second light indicator indicates whether the heat transfer plates have reached a predetermined temperature.

11. The device according to claim 1, wherein the heating thermal resistor, housed within the enclosure is attached and pressed against the heat transfer plate by an aluminium plate and releasable fastening elements.

12. The device according to claim 11, wherein an additional insulating layer is contemplated between the aluminium plate and the heating thermal resistor.

13. The device according to claim 1, wherein each casing has a casing interior with four corners, and each guide column is contained within the casing interior and is supported on a support attached to one of said four corners of the casing.

14. The device according to claim 1 wherein each releasable fastening element includes an elastic tab attached to a back side of each heating plate with a portion of the elastic tab retained in one slot of the casing.

15. A device for heating filled brioches with a frozen dough filling, which includes an upper subassembly and a lower subassembly hinged to one another; each subassembly including:
 a casing;
 at least one heating plate removably linked to the correspondent casing by at least one releasable fastening element attached to a back side of the heating plate, defining an open gap between the back side and an upper edge of the casing of the heating plate and the casing, the at least one releasable fastening element providing shifting of the heating plate relative to the respective casing while in operation;
 the heating plates of the upper and of the lower assembly being oppositely arranged when the device is in a closed position;
 at least one heat transfer plate, with a heating thermal resistor attached thereto, housed in an enclosure having a thermo-insulating layer, each heat transfer plate being in thermal contact with the back side of one heating plate, the enclosure having a guided shifting along a shifting stroke regarding the casing;
 loaded elastic elements that press each enclosure, and the heating transfer plate housed therein, against the correspondent heating plates ensuring contact and elastically urging the heating plates against the facing heating plate of the other subassembly when the device is in closed position through said shifting provided by the releasable fastening elements; and
 at least one thermostat configured to adjust the temperature of the heating plates,
wherein the lower subassembly consists of at least two independent heating plates, and the upper subassembly consists of at least two independent heating plates complementary to the heating plates of the lower subassembly.

16. The device according to claim 15, wherein each releasable fastening element comprises at least one elastic tab inserted in a slot of the casing, providing a releasable attachment between the heating plate and the respective casing.

17. The device according to claim 15, wherein each heating plate is a single piece heating element integrating, in a front side thereof, a semi spherical cavity for receiving a product and a channel surrounding the spherical cavity.

* * * * *